(12) United States Patent
Mitra (10) Patent No.: US 7,627,109 B2
(45) Date of Patent: Dec. 1, 2009

(54) CALL CENTER SYSTEM FOR MULTIPLE TRANSACTION SELECTIONS

(75) Inventor: Saikat Mitra, Fremont, CA (US)

(73) Assignee: AT&T Intellectual Property I, LP, Reno, NV (US)

( * ) Notice: Subject to any disclaimer, the term of this patent is extended or adjusted under 35 U.S.C. 154(b) by 1029 days.

(21) Appl. No.: 11/051,547

(22) Filed: Feb. 4, 2005

(65) Prior Publication Data

US 2006/0177040 A1  Aug. 10, 2006

(51) Int. Cl.
*H04M 3/00* (2006.01)

(52) U.S. Cl. .............................. 379/265.01; 379/265.05

(58) Field of Classification Search .................. 379/265, 379/67; 705/40
See application file for complete search history.

(56) References Cited

U.S. PATENT DOCUMENTS

| | | | |
|---|---|---|---|
| 4,696,028 A | 9/1987 | Morganstein et al. | |
| 4,788,715 A | 11/1988 | Lee | |
| 4,953,204 A | 8/1990 | Cuschleg et al. | |
| 4,964,077 A | 10/1990 | Eisen et al. | |
| 4,967,405 A | 10/1990 | Upp et al. | |
| 5,042,006 A | 8/1991 | Flohrer | |
| 5,235,679 A | 8/1993 | Yoshizawa et al. | |
| 5,335,269 A | 8/1994 | Steinlicht | |
| 5,416,830 A | 5/1995 | MacMillan, Jr. et al. | |
| 5,455,903 A | 10/1995 | Jolissaint et al. | |
| 5,497,373 A | 3/1996 | Hulen et al. | |
| 5,522,046 A | 5/1996 | McMillen et al. | |
| 5,530,744 A | 6/1996 | Charalambous et al. | |
| 5,555,299 A | 9/1996 | Maloney et al. | |
| 5,562,789 A | 10/1996 | Hoffmann | |
| 5,590,186 A | 12/1996 | Liao et al. | |
| 5,632,002 A | 5/1997 | Hashimoto et al. | |
| 5,754,639 A | 5/1998 | Flockhart et al. | |
| 5,754,978 A | 5/1998 | Perez-Mendez et al. | |
| 5,818,908 A * | 10/1998 | Kaplan ..................... | 379/88.21 |

(Continued)

FOREIGN PATENT DOCUMENTS

EP  0 424 015 A2  4/1991

(Continued)

OTHER PUBLICATIONS

Yahoo internet archive of Dec. 12, 1998, retrieved at <<http://web.archive.org/web/19981212034238/http://www.yahoo.com>>.

(Continued)

*Primary Examiner*—Creighton Smith
(74) *Attorney, Agent, or Firm*—Toler Law Group (57) ABSTRACT

A user interface for an agent of a call center comprises a transaction menu that lists possible transactions that the agent can fulfill. Multiple transactions selected by the agent from the transaction menu are ordered into a first sequence of agent-selected transactions that are to be fulfilled in a call, and the first sequence is displayed. A selection of at least one additional transaction from the transaction menu is received after the agent has begun to address one of the agent-selected transactions from the first sequence but before the agent has completed all of the agent-selected transactions from the first sequence. Uncompleted ones of the agent-selected transactions including the at least one additional transaction are ordered into a second sequence of agent-selected transactions, and the second sequence is displayed.

20 Claims, 6 Drawing Sheets

U.S. PATENT DOCUMENTS

| | | | |
|---|---|---|---|
| 5,900,608 A | 5/1999 | Lida | |
| 5,918,213 A | 6/1999 | Bernard et al. | |
| 5,923,745 A | 7/1999 | Hurd | |
| 5,940,476 A | 8/1999 | Morganstein et al. | |
| 5,946,388 A | 8/1999 | Walker et al. | |
| 5,953,704 A | 9/1999 | McIlroy et al. | |
| 5,991,756 A | 11/1999 | Wu | |
| 5,995,979 A | 11/1999 | Cochran | |
| 5,999,965 A | 12/1999 | Kelly | |
| 6,002,689 A | 12/1999 | Christie | |
| 6,002,760 A | 12/1999 | Gisby | |
| 6,003,011 A | 12/1999 | Sarin et al. | |
| 6,038,293 A | 3/2000 | McNerney et al. | |
| 6,049,594 A | 4/2000 | Furman et al. | |
| 6,064,731 A | 5/2000 | Flockhart et al. | |
| 6,118,866 A | 9/2000 | Shtivelman | |
| 6,119,101 A | 9/2000 | Peckover | |
| 6,119,106 A * | 9/2000 | Mersky et al. | 705/40 |
| RE37,001 E | 12/2000 | Morganstein et al. | |
| 6,173,266 B1 | 1/2001 | Marx et al. | |
| 6,173,289 B1 | 1/2001 | Sonderegger et al. | |
| 6,173,399 B1 | 1/2001 | Gilbrech | |
| 6,175,621 B1 | 1/2001 | Begeja | |
| 6,259,786 B1 | 7/2001 | Gisby | |
| 6,269,153 B1 | 7/2001 | Carpenter et al. | |
| 6,317,439 B1 | 11/2001 | Cardona et al. | |
| 6,333,980 B1 | 12/2001 | Hollatz et al. | |
| 6,353,608 B1 | 3/2002 | Cullers et al. | |
| 6,366,658 B1 | 4/2002 | Bjornberg et al. | |
| 6,366,668 B1 | 4/2002 | Borst et al. | |
| 6,381,329 B1 | 4/2002 | Uppaluru et al. | |
| 6,384,584 B2 | 5/2002 | Sugano | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,411,687 B1 | 6/2002 | Bohacek et al. | |
| 6,414,966 B1 | 7/2002 | Kulkami et al. | |
| 6,418,424 B1 | 7/2002 | Hoffberg et al. | |
| 6,421,433 B1 | 7/2002 | Arsenault | |
| 6,434,546 B1 | 8/2002 | Williamowski et al. | |
| 6,442,247 B1 | 8/2002 | Garcia | |
| 6,449,226 B1 | 9/2002 | Kumagai | |
| 6,510,414 B1 | 1/2003 | Chaves | |
| 6,519,562 B1 | 2/2003 | Phillips et al. | |
| 6,526,126 B1 | 2/2003 | Morganstein et al. | |
| 6,529,871 B1 | 3/2003 | Kanevsky et al. | |
| 6,553,112 B2 | 4/2003 | Ishikawa | |
| 6,553,113 B1 | 4/2003 | Dhir et al. | |
| 6,570,967 B2 | 5/2003 | Katz | |
| 6,574,599 B1 | 6/2003 | Lim et al. | |
| 6,584,180 B2 | 6/2003 | Nemoto | |
| 6,584,191 B1 | 6/2003 | McPartlan et al. | |
| 6,587,556 B1 | 7/2003 | Judkins et al. | |
| 6,598,021 B1 | 7/2003 | Sahmbaugh et al. | |
| 6,598,136 B1 | 7/2003 | Norrod et al. | |
| 6,600,736 B1 | 7/2003 | Ball et al. | |
| 6,603,854 B1 | 8/2003 | Judkins et al. | |
| 6,614,781 B1 | 9/2003 | Elliott et al. | |
| 6,615,248 B1 | 9/2003 | Smith | |
| 6,631,186 B1 | 10/2003 | Adams et al. | |
| 6,662,163 B1 | 12/2003 | Albayrak et al. | |
| 6,678,360 B1 | 1/2004 | Katz | |
| 6,678,718 B1 | 1/2004 | Khouri et al. | |
| 6,690,788 B1 | 2/2004 | Bauer et al. | |
| 6,694,012 B1 | 2/2004 | Posthuma | |
| 6,697,460 B2 | 2/2004 | Knott et al. | |
| 6,700,972 B1 | 3/2004 | McHugh et al. | |
| 6,704,404 B1 | 3/2004 | Burnett | |
| 6,707,789 B1 | 3/2004 | Arslan et al. | |
| 6,714,631 B1 | 3/2004 | Martin et al. | |
| 6,714,643 B1 | 3/2004 | Gargeya et al. | |
| 6,721,416 B1 | 4/2004 | Farrell | |
| 6,731,722 B2 | 5/2004 | Coffey | |
| 6,738,082 B1 | 5/2004 | Dong et al. | |
| 6,738,473 B1 | 5/2004 | Burg et al. | |
| 6,744,861 B1 | 6/2004 | Pershan et al. | |
| 6,744,877 B1 | 6/2004 | Edwards | |
| 6,751,306 B2 | 6/2004 | Himmel et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,792,096 B2 | 9/2004 | Martin et al. | |
| 6,807,274 B2 | 10/2004 | Joseph et al. | |
| 6,823,307 B1 | 11/2004 | Steinbiss et al. | |
| 6,831,932 B1 | 12/2004 | Boyle et al. | |
| 6,832,224 B2 | 12/2004 | Gilmour | |
| 6,842,504 B2 | 1/2005 | Mills et al. | |
| 6,847,711 B2 | 1/2005 | Knott et al. | |
| 6,853,722 B2 | 2/2005 | Joseph et al. | |
| 6,853,966 B2 | 2/2005 | Bushey et al. | |
| 6,859,529 B2 | 2/2005 | Duncan et al. | |
| 6,871,212 B2 | 3/2005 | Khouri et al. | |
| 6,879,683 B1 | 4/2005 | Fain et al. | |
| 6,885,734 B1 | 4/2005 | Eberle et al. | |
| 6,891,932 B2 | 5/2005 | Bhargava et al. | |
| 6,895,083 B1 | 5/2005 | Bers et al. | |
| 6,901,366 B1 | 5/2005 | Kuhn et al. | |
| 6,907,119 B2 | 6/2005 | Case et al. | |
| 6,915,246 B2 | 7/2005 | Gusler et al. | |
| 6,925,155 B2 | 8/2005 | Reynolds et al. | |
| 6,963,983 B2 | 11/2005 | Munson et al. | |
| 6,970,554 B1 | 11/2005 | Peterson et al. | |
| 7,003,079 B1 | 2/2006 | McCarthy et al. | |
| 7,006,605 B1 | 2/2006 | Morganstein et al. | |
| 7,027,586 B2 | 4/2006 | Bushey et al. | |
| 7,027,975 B1 | 4/2006 | Pazandak et al. | |
| 7,039,166 B1 | 5/2006 | Peterson et al. | |
| 7,062,505 B2 | 6/2006 | Lane et al. | |
| 7,072,457 B2 | 7/2006 | Brown et al. | |
| 7,106,850 B2 | 9/2006 | Campbell et al. | |
| 7,142,652 B2 | 11/2006 | Ho | |
| 7,177,792 B2 | 2/2007 | Knight et al. | |
| 7,197,130 B2 | 3/2007 | Paden et al. | |
| 7,200,614 B2 | 4/2007 | Reid et al. | |
| 2001/0011211 A1 | 8/2001 | Bushey et al. | |
| 2001/0018672 A1 | 8/2001 | Petters et al. | |
| 2001/0021948 A1 | 9/2001 | Khouri et al. | |
| 2001/0032229 A1 | 10/2001 | Hulls et al. | |
| 2001/0034662 A1 | 10/2001 | Morris | |
| 2002/0046030 A1 | 4/2002 | Haritsa et al. | |
| 2002/0049874 A1 | 4/2002 | Kimura | |
| 2002/0057678 A1 | 5/2002 | Jiang et al. | |
| 2002/0059164 A1 | 5/2002 | Shtivelman | |
| 2002/0059169 A1 | 5/2002 | Quarterman et al. | |
| 2002/0067714 A1 | 6/2002 | Crain et al. | |
| 2002/0087385 A1 | 7/2002 | Vincent | |
| 2002/0114432 A1 | 8/2002 | Shaffer et al. | |
| 2002/0133394 A1 | 9/2002 | Bushey et al. | |
| 2002/0133413 A1 | 9/2002 | Chang et al. | |
| 2002/0135618 A1 | 9/2002 | Maes et al. | |
| 2002/0156699 A1 | 10/2002 | Gray et al. | |
| 2002/0165732 A1 | 11/2002 | Ezzeddine et al. | |
| 2002/0196277 A1 | 12/2002 | Bushey et al. | |
| 2003/0018659 A1 | 1/2003 | Fuks et al. | |
| 2003/0026409 A1 | 2/2003 | Bushey et al. | |
| 2003/0035381 A1 | 2/2003 | Chen et al. | |
| 2003/0035516 A1 | 2/2003 | Guedalia | |
| 2003/0069937 A1 | 4/2003 | Khouri et al. | |
| 2003/0083479 A1 | 5/2003 | Baker et al. | |
| 2003/0097428 A1 | 5/2003 | Afkhami et al. | |
| 2003/0103619 A1 | 6/2003 | Brown et al. | |
| 2003/0114105 A1 | 6/2003 | Haller et al. | |

| | | |
|---|---|---|
| 2003/0118159 A1 | 6/2003 | Shen et al. |
| 2003/0130864 A1 | 7/2003 | Ho et al. |
| 2003/0143981 A1 | 7/2003 | Kortum et al. |
| 2003/0144846 A1 | 7/2003 | Denenberg et al. |
| 2003/0144919 A1 | 7/2003 | Trompette et al. |
| 2003/0156133 A1 | 8/2003 | Martin et al. |
| 2003/0165223 A1 | 9/2003 | Timmins et al. |
| 2003/0187732 A1 | 10/2003 | Seta |
| 2003/0187773 A1 | 10/2003 | Santos et al. |
| 2003/0194063 A1 | 10/2003 | Martin et al. |
| 2003/0202640 A1 | 10/2003 | Knott et al. |
| 2003/0202643 A1 | 10/2003 | Joseph et al. |
| 2003/0202649 A1 | 10/2003 | Haug, Jr. et al. |
| 2003/0204435 A1 | 10/2003 | McQuilkin et al. |
| 2003/1095723 | 10/2003 | Homuth et al |
| 2003/0228007 A1 | 12/2003 | Kurosaki |
| 2003/0235282 A1 | 12/2003 | Sichelman et al. |
| 2003/0235287 A1 | 12/2003 | Margolis |
| 2004/0005047 A1 | 1/2004 | Joseph et al. |
| 2004/0006473 A1 | 1/2004 | Mills et al. |
| 2004/0032862 A1 | 2/2004 | Schoeneberger et al. |
| 2004/0032935 A1 | 2/2004 | Mills et al. |
| 2004/0042592 A1 | 3/2004 | Knott et al. |
| 2004/0044950 A1 | 3/2004 | Mills et al. |
| 2004/0066401 A1 | 4/2004 | Bushey et al. |
| 2004/0066416 A1 | 4/2004 | Knott et al. |
| 2004/0073569 A1 | 4/2004 | Knott et al. |
| 2004/0083479 A1 | 4/2004 | Bondarenko et al. |
| 2004/0088285 A1 | 5/2004 | Martin et al. |
| 2004/0103017 A1 | 5/2004 | Reed et al. |
| 2004/0109555 A1 | 6/2004 | Williams |
| 2004/0120473 A1 | 6/2004 | Birch et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0174980 A1 | 9/2004 | Knott et al. |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2005/0008141 A1 | 1/2005 | Kortum et al. |
| 2005/0015197 A1 | 1/2005 | Ohtsuji et al. |
| 2005/0015744 A1 | 1/2005 | Bushey et al. |
| 2005/0027535 A1 | 2/2005 | Martin et al. |
| 2005/0041796 A1 | 2/2005 | Joseph et al. |
| 2005/0047578 A1 | 3/2005 | Knott et al. |
| 2005/0055216 A1 | 3/2005 | Bushey et al. |
| 2005/0058264 A1 | 3/2005 | Joseph et al. |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0141692 A1 | 6/2005 | Scherer et al. |
| 2005/0147218 A1 | 7/2005 | Novack et al. |
| 2005/0169441 A1 | 8/2005 | Yacoub et al. |
| 2005/0169453 A1 | 8/2005 | Knott et al. |
| 2005/0201531 A1 | 9/2005 | Kanter et al. |
| 2005/0201547 A1 | 9/2005 | Burg et al. |
| 2005/0240411 A1 | 10/2005 | Yacoub |
| 2006/0023863 A1* | 2/2006 | Joseph et al. .......... 379/265.02 |
| 2006/0026049 A1 | 2/2006 | Joseph et al. |
| 2006/0056406 A1 | 3/2006 | Bouchard et al. |
| 2006/0126811 A1 | 6/2006 | Bushey et al. |
| 2006/0165066 A1 | 7/2006 | Campbell et al. |
| 2006/0177040 A1 | 8/2006 | Mitra |
| 2006/0188087 A1 | 8/2006 | Kortum et al. |
| 2006/0195312 A1 | 8/2006 | Knight et al. |
| 2006/0291642 A1 | 12/2006 | Bushey et al. |
| 2007/0041551 A1 | 2/2007 | Whitecotten et al. |
| 2007/0047720 A1 | 3/2007 | Brandt et al. |
| 2007/0116230 A1 | 5/2007 | Brandt et al. |

FOREIGN PATENT DOCUMENTS

| | | |
|---|---|---|
| EP | 0 424 015 A3 | 4/1991 |
| EP | 0 424 015 B1 | 4/1991 |
| WO | 97/26612 A1 | 7/1997 |
| WO | 01-37539 A2 | 5/2001 |
| WO | 01-37539 A3 | 5/2001 |
| WO | 2004/017584 A1 | 2/2004 |
| WO | 2004/049222 A2 | 6/2004 |

OTHER PUBLICATIONS

Ogino, Tsukasa, et al., "Technologies for Internet Infrastructure: Eliminating the World Wide Wait," iNet Japan, Jul. 18-21, 2000, www.isoc.org/inet2000/cdproceedings/1g/index.

* cited by examiner

CALL CENTER SYSTEM FOR MULTIPLE TRANSACTION SELECTIONS

FIELD OF THE DISCLOSURE

The present disclosure relates to methods and systems for use in a call center.

BACKGROUND

Call center agents are challenged by customers who bring up multiple service needs in a telephone call. Agents are further challenged when, while fulfilling one of the customers needs, the customer brings up one or more additional service needs in the telephone call. Traditionally, agents are compelled to scribble on a piece of paper as multiple and additional service needs are identified. Agents are required to depend on their knowledge and training to sequence fulfillment of the multiple service needs. At the end of the telephone call, an agent manually checks his/her writings on the paper to ensure that all of the multiple service needs have been fulfilled.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Disclosed herein are embodiments of a user interface usable by call center agents when interacting with a customer during a telephone call. The user interface provides an electronic checklist of service transactions that enables call center agents to quickly capture customers' service needs at any time during a telephone call. Based on the captured needs, business rules are applied to order the associated service transactions into a preferred sequence. The user interface launches the service transactions in sequence. After each transaction is completed, the user interface updates the status of the transactions, and a next transaction in the sequence is launched. The user interface enables call center agents to determine if a customer is a repeat caller or is calling about an unresolved issue. The user interface further enables call center agents to characterize the customer (e.g. to indicate that the customer is irate).

Figure 1:
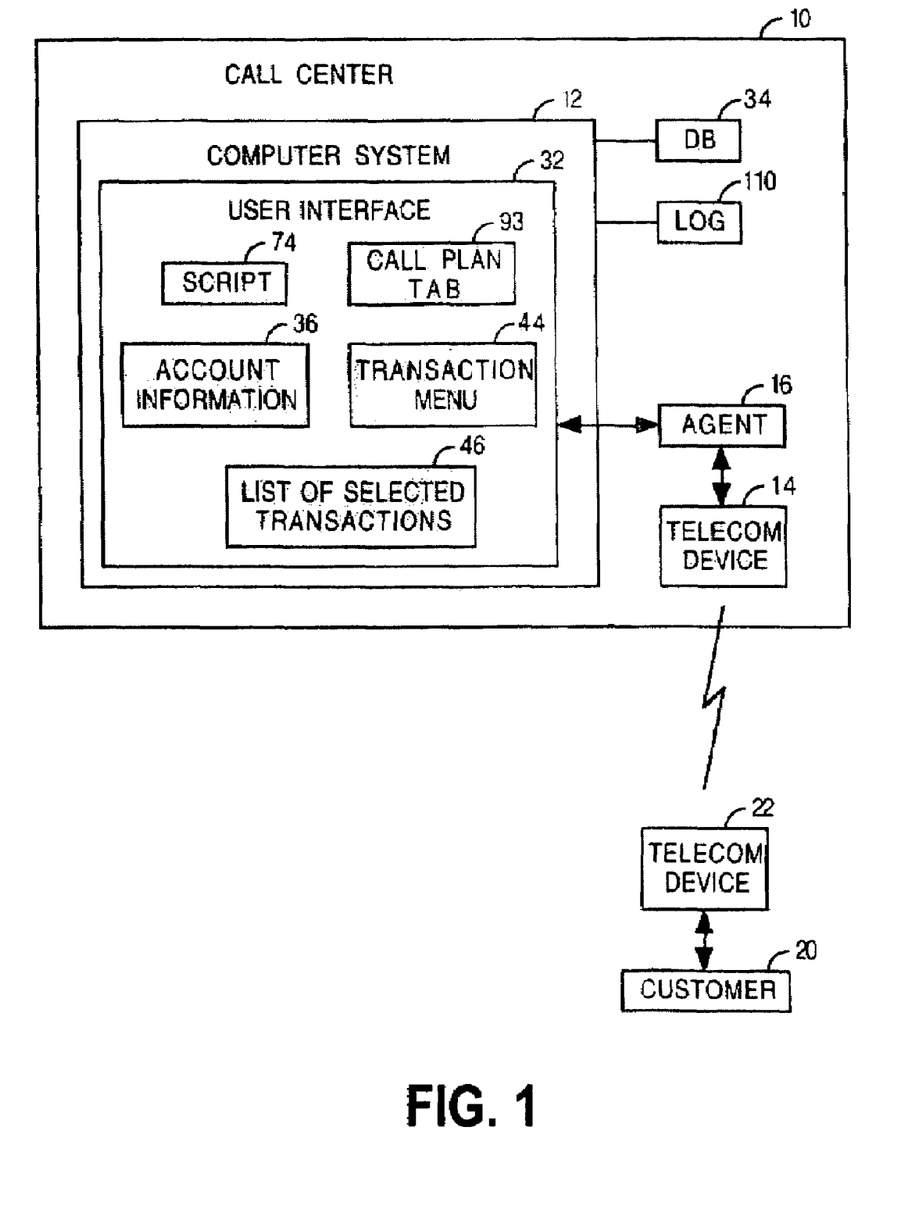
FIG. 1 is a block diagram of an embodiment of a call center system.

Embodiments are described with reference to FIG. 1, which is a block diagram of an embodiment of a call center system, and FIG. 2, which is a flow chart of an embodiment of a method performed using the call center system.

A call center 10 has a computer system 12 and a telecommunication device 14, both usable by an agent 16 to handle incoming customer service calls. The telecommunication device 14 may comprise a telephone or an alternative device that allows the agent 16 to speak or otherwise communicate to remotely located customers. For purposes of illustration and example, consider a customer 20 who calls the call center 10 using his/her telecommunication device 22, such as a telephone. The call center 10 directs the call to the telecommunication device 14 of the agent 16 so that the agent 16 can service need(s) of the customer 20.

As indicated by block 30, the method comprises providing a user interface 32 using the computer system 12. The user interface 32 assists the agent 16 in identifying customer needs, mapping needs to specific transactions, ordering the transactions into a sequence, launching the transactions in sequence, and indicating the status of each transaction. Initially, the user interface 32 displays or otherwise provides customer account information retrieved from a database 34. In the above example, the user interface 32 displays account information 36 for the customer 20, the account information 36 retrieved from the database 34. The account information 36 may comprise one or more account numbers, pending order information, a billing name, a billing address, an email address, a service address and a contact history.

As indicated by block 40, the method comprises receiving one or more needs communicated by the customer 20. The need(s) are spoken or otherwise expressed by the customer 20 using the telecommunication device 22, and are received by the agent 16 using the telecommunication device 14.

As indicated by block 42, the agent 16 uses the user interface 32 to map the need(s) to specific transaction(s), and to enter the specific transaction(s) into the computer system 12. The user interface 32 comprises a transaction menu 44 that lists possible transactions that the agent 16 can fulfill. In applications where the agent 16 is to handle customers of a telecommunications company, the transaction menu 44 may list various possible billing transactions, collections transactions, ordering transactions, repair transactions and account maintenance transactions. The agent 16 finds the specific transaction(s) from the transaction menu 44 that apply to the need(s) of the customer 20, and enters the specific transaction(s) by making selection(s) from the transaction menu 44. The selection(s) are made using a user input device of the computer system 12, examples of which include but are not limited to a keyboard, a voice input device, a mouse, a touch pad, a touch screen, a pointing stick, a track ball or an alternative pointing device. The user interface 32 provides a list 46 of the selected transactions.

Figure 3:
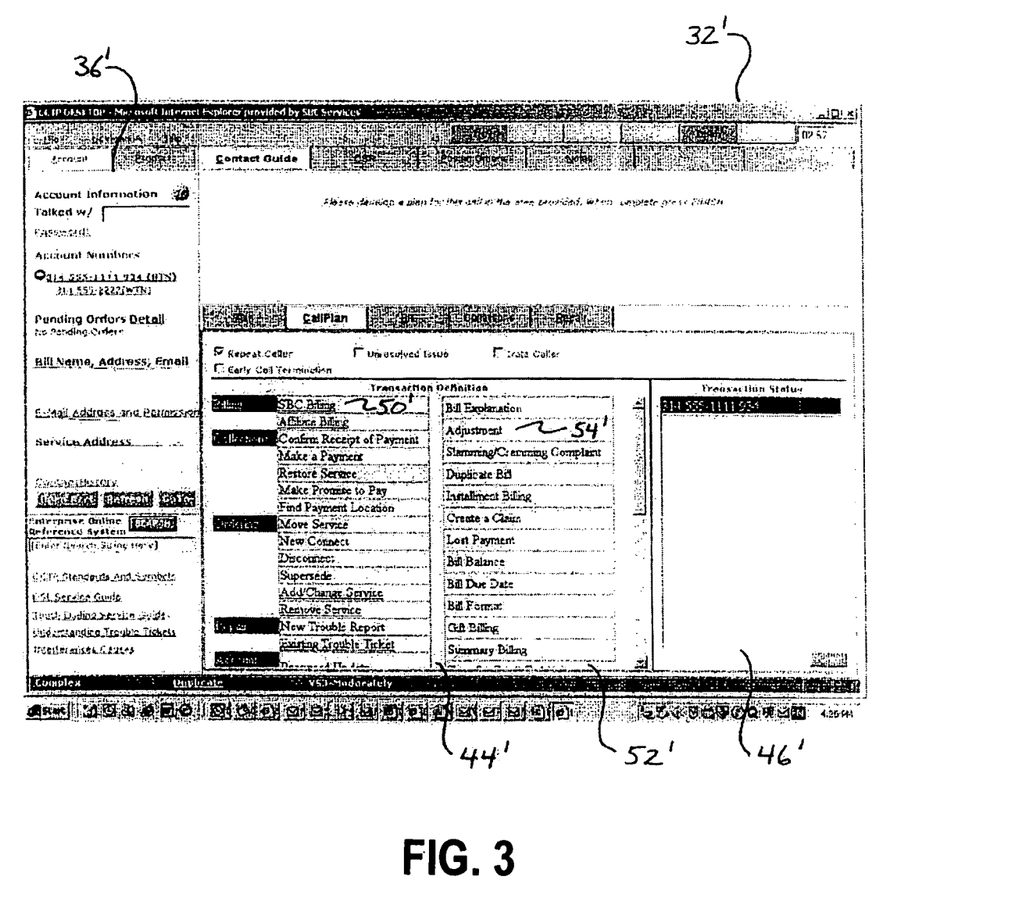
FIG. 3 is a screen shot of an embodiment of the user interface.

FIG. 3 shows an embodiment of a user interface 32'. Customer information 36' is disposed on a left side of the user interface 32'. A transaction menu 44' is disposed at a center portion of the user interface 32'. The transaction menu 44' provides various transaction definitions. A right portion of the user interface 32' is to provide a list 46' of selected transaction(s) and their status.

Figure 4:
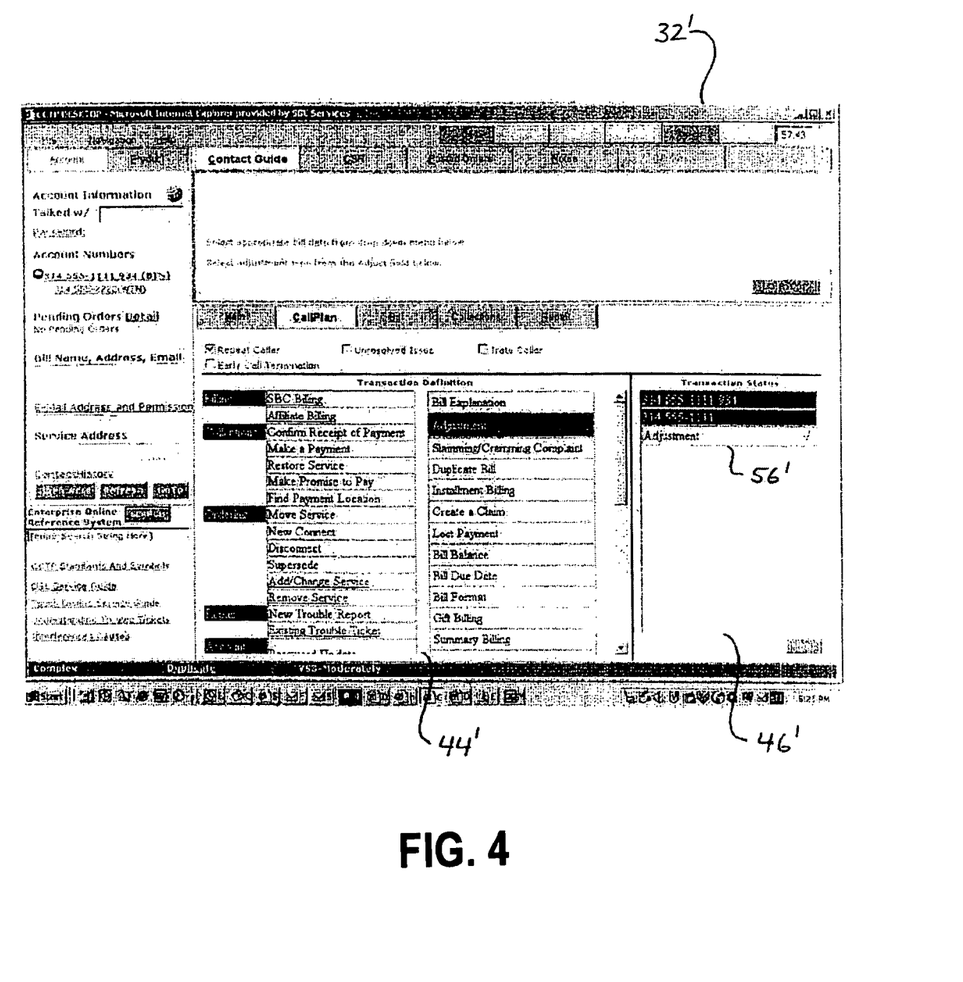
FIG. 4 is a screen shot of an embodiment of the user interface after a first transaction has been entered.

For purposes of illustration and example, consider that the customer 20 expresses a need for a bill adjustment. In response to learning of the need, the agent 16 selects a billing transaction option 50' from the transaction menu 44'. A menu 52' of specific billing transactions are also provided in the transaction menu 44'. The menu 52' of specific billing transactions may be displayed in response to the agent's selection of the billing transaction option 50'. From the menu 52', the agent 16 selects an adjustment option 54'. In response to the agent's selection, the user interface 32' adds an adjustment transaction 56' to the list 46' as shown in FIG. 4.

Figure 5:
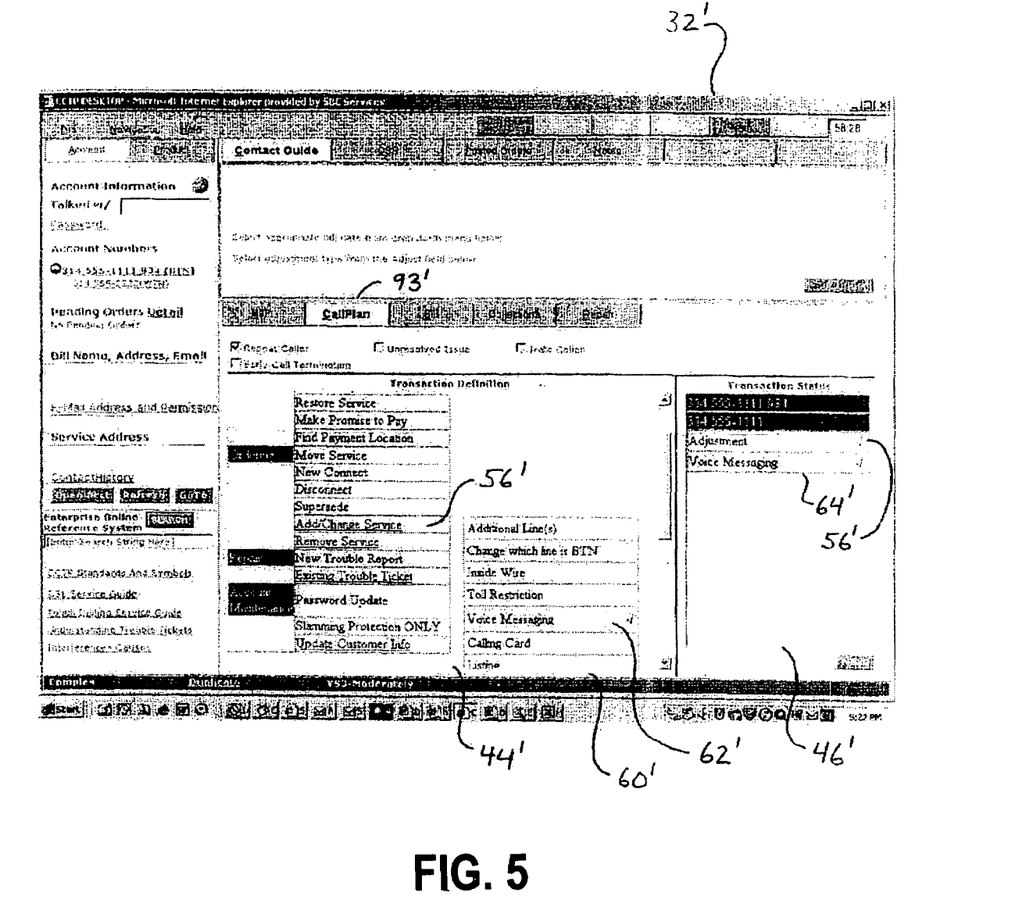
FIG. 5 is a screen shot of an embodiment of the user interface after a second transaction has been entered.

Further for purposes of illustration and example, consider that the customer 20 expresses a need to order voice mail in addition to the bill adjustment. In response to learning of the second need, the agent 16 scrolls down the transaction menu 44' to a portion shown in FIG. 5. The agent 16 selects an add/change service transaction option 56'. A menu 60' of specific add/change service transactions are also provided in the transaction menu 44'. The menu 60' of specific add/change service transactions may be displayed in response to the agent's selection of the add/change service transaction option 56'. From the menu 60', the agent 16 selects the voice messaging option 62'. In response to the agent's selection, the user interface 32' adds a voice messaging transaction 64' to the list 46' as shown in FIG. 5.

Returning back to FIG. 2, as indicated by block 70, the computer system 12 orders the transaction(s) into a sequence based on one or more business rules. The computer system 12 may use an optimization algorithm to optimize the sequence of the transaction(s) based on an objective function and constraints imposed by the business rule(s). The objective function may be a measure of call flow (e.g. an average handle time or a worst-case handle time), in which case the sequence is optimized to provide an optimal call flow. If not optimal, the sequence acts to improve the call flow in fulfilling the transaction(s). An example of a business rule is a rule specifying that a collection transaction must precede an ordering transaction for a customer "in treatment". Thus, the order in the sequence may differ from the order in which the transaction(s) were selected by the agent 16.

As indicated by block 72, the user interface 32 displays a script 74 for a next uncompleted transaction in the sequence. Initially, the user interface 32 displays a script for the first transaction in the sequence.

As indicated by block 76, the agent 16 interacts with the user interface 32 and/or the customer 20 based on the script 74 to address the current transaction in the sequence. When the current transaction has been completed (block 80), the user interface 32 updates a displayed status of the transaction in the list 46' to indicate that the transaction has been completed (block 82).

As indicated by block 84, if any uncompleted transactions are remaining in the sequence, flow of the method is directed back to block 72, wherein the user interface 32 displays another script, the other script being for a next uncompleted transaction in the sequence. The next transaction is addressed as described with reference to blocks 76, 80 and 82.

At any time in the call, the customer 20 may speak or otherwise express one or more additional need(s). As indicated by block 90, the method comprises the agent 16 receiving the one or more additional needs communicated by the customer 20.

Optionally, as indicated by block 92, the method comprises receiving a user input made by the agent 16 to return to the user interface 32 that is receptive to additional transaction(s) entered by the agent 16. The user input may comprise a selection of a graphical tab 93 or another graphical object. The embodiment of FIGS. 3-5 show the graphical tab 93 being labeled as a "Call Plan" tab 93'.

As indicated by block 94, the agent 16 uses the user interface 32 to map the additional need(s) to specific additional transaction(s), and to enter the specific additional transaction(s) into the computer system 12.

As indicated by block 96, the computer system 12 orders the remaining transaction(s), including the additional transaction(s), into a sequence based on one or more business rules. This act is similar to the act preformed in block 70, however the introduction of the additional transaction(s) may cause a different transaction order to be produced. The computer system 12 may use an optimization algorithm to optimize the sequence of the remaining transaction(s) based on the objective function and the constraints imposed by the business rules. The objective function may be a measure of call flow (e.g. an average handle time or a worst-case handle time), in which case the sequence is optimized to provide an optimal call flow. If not optimal, the sequence acts to improve the call flow in fulfilling the remaining transaction(s). Thus, the order in the sequence may differ from the order in which the transaction(s) were selected by the agent 16.

Figure 2:
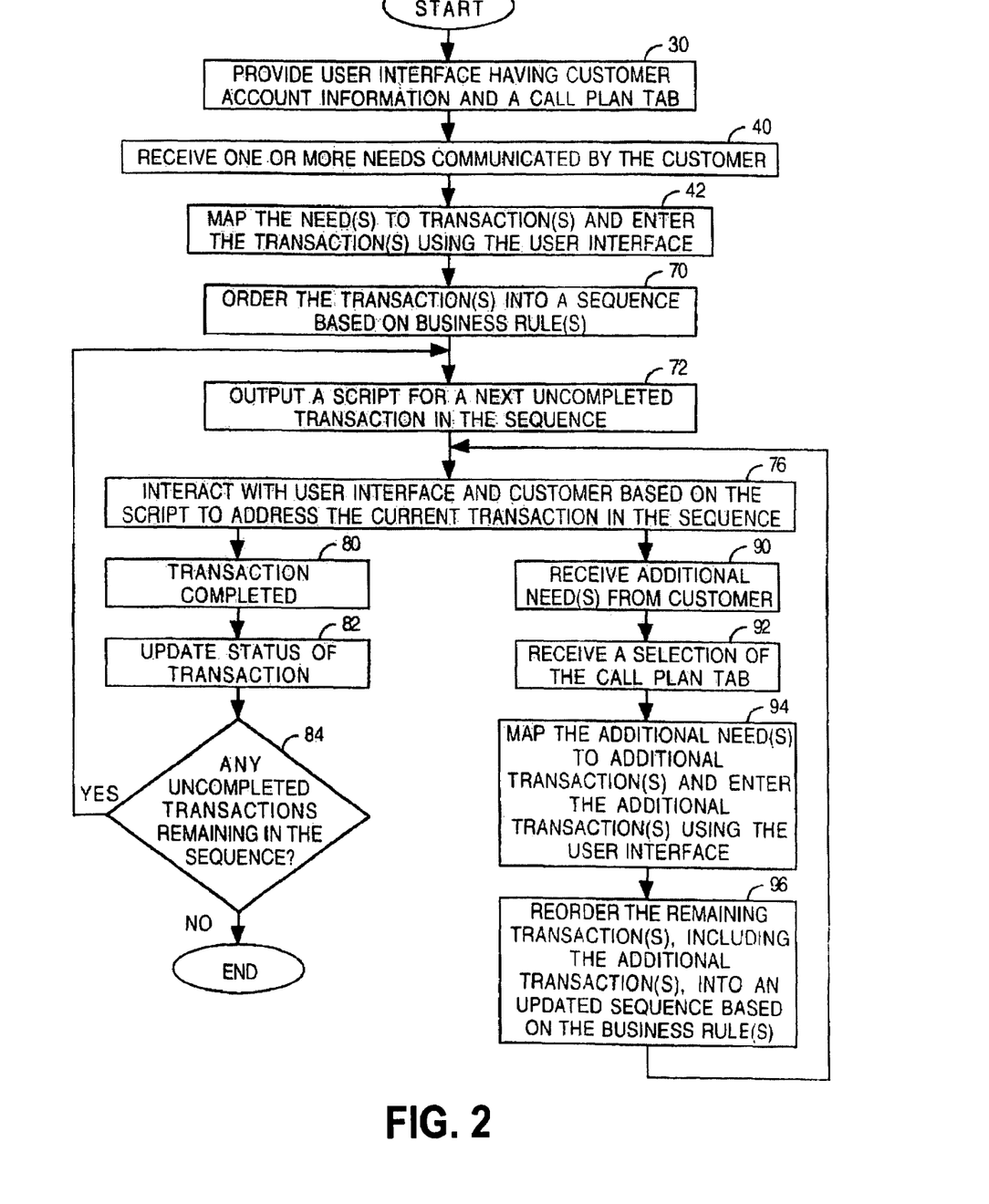
FIG. 2 is a flow chart of an embodiment of a method performed using the call center system.
Figure 6:
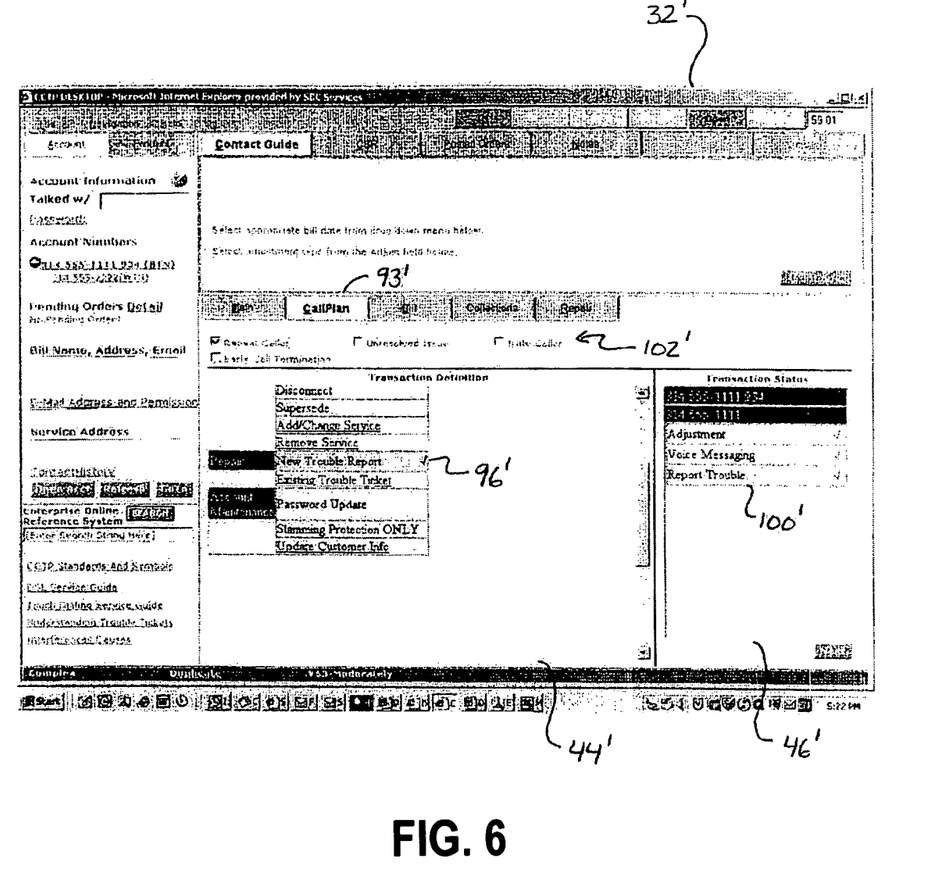
FIG. 6 is a screen shot of an embodiment of the user interface after a third transaction has been entered after an agent has begun but not completed addressing the first transaction.

For purposes of illustration and example, FIG. 2 depicts the additional need(s) being received from the customer 20 (block 90) after the agent 16 has begun to address a transaction (block 76), but before the agent 16 has completed the transaction (block 80). In this case, after the agent has entered the additional need(s) (block 94), flow of the method is directed back to block 76 so that the agent can continue to address the transaction which was interrupted. More generally, the agent 16 can make a selection of at least one additional transaction from the transaction menu 44 after the agent 16 has begun to address one of the agent-selected transactions from the list 46 but before the agent 16 has completed the all of the agent-selected transactions from the list 46. For example, consider the customer 20 bringing up an additional need in the middle of the call and while the agent 16 is working on the billing adjustment. The additional need is to report a problem with the customer's phone equipment and to open an associated trouble ticket. In response to learning of the additional need, the agent 16 selects a new trouble report option 96' from the transaction menu 44' as shown in FIG. 6. In response to the agent's selection, the user interface 32' adds a report trouble transaction 100' to the list 46', and optionally re-orders the agent-selected transactions in the list 46'. Thereafter, the agent 16 can return to working on the billing adjustment.

Optionally, as shown in FIGS. 3-6, the user interface 32' further comprises user interface elements 102' that are receptive to selections by the agent 16. The user interface elements 102' allow the agent 16 to indicate if the customer 20 is a repeat caller, if an issue is unresolved, if the customer 20 is an irate caller, or if the call was terminated early. The user interface elements 102' comprise graphical check boxes in one embodiment.

The acts performed by the computer system 12 to provide the user interface 32 and 32' can be directed by a computer-readable medium having computer-readable program code stored therein.

The herein-disclosed method and system simplify and streamline the process of managing multiple service transactions. Contact flow can be optimized to improve an average handle time for the contact. Providing a check list for the transactions mitigates agents forgetting to address some of the multiple service needs of a customer. Thus, customers' experiences with the call center 10 are improved.

Additionally, the computer system 12 can log or otherwise store a history of customer interactions in a customer contact history log 110. The history can be logged in real-time based on the computer system's 12 real-time knowledge of the service needs and transactions.

It will be apparent to those skilled in the art that the disclosed embodiments may be modified in numerous ways and may assume many embodiments other than the particular forms specifically set out and described herein. For example, some acts described with reference to FIG. 2 can be performed in a different order than that depicted in FIG. 2 without affecting their results.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-readable storage medium having computer-readable program code to cause a computer system to perform acts of:
    displaying on a screen a transaction menu that lists possible transactions that an agent of a call center can fulfill;
    ordering a plurality of transactions selected by the agent from the transaction menu into a list of agent-selected transactions that are to be fulfilled for a call;
    displaying on the screen the list of agent-selected transactions, the list including an indicator of a status of each of the agent-selected transactions and the list separated into a first group of agent-selected transactions that are completed and a second group of agent-selected transactions that are uncompleted;
    receiving a selection of at least one additional transaction from the transaction menu after the agent has begun to address one of the agent-selected transactions from the list but before the agent has completed all of the agent-selected transactions from the list; and
    updating the list to include the at least one additional transaction.

2. The computer-readable storage medium of claim 1 wherein the selection of at least one additional transaction from the transaction menu is received after the agent has begun to address a transaction but before the agent has completed the transaction.

3. The computer-readable storage medium of claim 2 wherein the acts further comprise:
    displaying a script for the transaction.

4. The computer-readable storage medium of claim 2 wherein the acts further comprise:
    changing the indicator of the status of the transaction when the transaction has been completed.

5. The computer-readable storage medium of claim 1 wherein the second group is ordered based on at least one business rule.

6. The computer-readable storage medium of claim 1 wherein the second group is ordered to improve a handle time for customer contact.

7. The computer-readable storage medium of claim 1 wherein the second group is ordered to improve an average handle time for customer contact based on at least one business rule.

8. The computer-readable storage medium of claim 1 wherein the first group is highlighted on the screen to distinguish the first group from the second group.

9. The computer-readable storage medium of claim 1 wherein the acts further comprise:
    receiving at least one entry from the agent characterizing an emotional state of a person interacting with the agent via the call.

10. The computer-readable storage medium of claim 1 wherein the acts further comprise:
    launching a next agent-selected transaction in the second group when a particular agent-selected transaction is completed.

11. A method comprising:
    displaying on a screen coupled to a computer system a transaction menu that lists possible transactions that an agent of a call center can fulfill;
    using the computer system to order a plurality of transactions selected by the agent from the transaction menu into a list of agent-selected transactions that are to be fulfilled with respect to a call;
    displaying on the screen the list of agent-selected transactions, the list including an indicator of a status of each of the agent-selected transactions and the list including a first group of agent-selected transactions that are completed and a second group of agent-selected transactions that are uncompleted;
    receiving at the computer system a selection of at least one additional transaction from the transaction menu after the agent has begun to address one of the agent-selected transactions from the second group but before the agent has completed all of the agent-selected transactions from the list; and
    updating the list to include the at least one additional transaction.

12. The method of claim 11 wherein the selection of at least one additional transaction from the transaction menu is received after the agent has begun to address a particular transaction but before the agent has completed the particular transaction.

13. The method of claim 12 further comprising:
    displaying a script for the particular transaction.

14. The method of claim 12 further comprising:
    changing the indicator of the status of the current transaction when the particular transaction has been completed.

15. The method of claim 11 wherein the second group is ordered based on at least one business rule.

16. The method of claim 11 wherein the second group is ordered to improve a handle time for customer contact.

17. The method of claim 11 wherein the second group is ordered to reduce an average handle time for customer contact based on at least one business rule.

18. The method of claim 11 wherein the first group is highlighted on the screen to distinguish the first group from the second group.

19. The method of claim 11 further comprising:
    receiving at least one entry from the agent characterizing an emotional state of a person interacting with the agent via the call.

20. The method of claim 11 further comprising:
    launching a next agent-selected transaction in the second group when a particular agent-selected transaction is completed.

* * * * *